(12) United States Patent
Kumar (10) Patent No.: US 11,853,586 B2
(45) Date of Patent: Dec. 26, 2023

(54) AUTOMATED USAGE BASED COPY DATA TIERING SYSTEM

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/074,899

(22) Filed: Oct. 20, 2020

(65) Prior Publication Data
US 2022/0121366 A1   Apr. 21, 2022

(51) Int. Cl.
*G06F 3/06*   (2006.01)

(52) U.S. Cl.
CPC ............ *G06F 3/065* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,751,725 B1 * | 6/2014 | Gangadharan | ...... | G06F 12/0638 711/158 |
| 8,977,826 B1 * | 3/2015 | Meiri | ................. | G06F 11/2064 711/159 |
| 9,189,387 B1 | 11/2015 | Taylor et al. | | |
| 9,594,780 B1 * | 3/2017 | Esposito | ............. | G06F 16/2282 |
| 2018/0356989 A1 * | 12/2018 | Meister | ................. | G06F 3/0649 |
| 2019/0129621 A1 * | 5/2019 | Kushwah | ............ | G06F 11/1451 |
| 2019/0220344 A1 * | 7/2019 | Coronado | ............ | G06F 11/203 |
| 2020/0073572 A1 * | 3/2020 | Deguchi | ............... | G06F 3/0671 |
| 2021/0011623 A1 * | 1/2021 | Fay | ..................... | G06F 12/0246 |
| 2021/0157504 A1 * | 5/2021 | Hinman | ................ | G06F 3/0604 |

OTHER PUBLICATIONS

Dell Technologies, "Dell EMC PowerMax: Family Overview," Technical White Paper, Sep. 2020, 52 pages.
NVM Express, "NVM Express, Revision 1.3," NVM Express, May 1, 2017, 282 pages.

* cited by examiner

*Primary Examiner* — Arpan P. Savla
*Assistant Examiner* — Edmund H Kwong
(74) *Attorney, Agent, or Firm* — Ryan, Mason & Lewis, LLP (57) ABSTRACT

Techniques are disclosed herein for improved copy data management functionality in storage systems. For example, a method receives copy usage data for one or more data copies associated with a storage array, wherein the copy usage data is indicative of a usage associated with each of the one or more data copies, and updates the one or more data copies with one or more usage tags based on the received copy usage data. Further, the method may then scan the one or more usage tags associated with each of the one or more data copies, select one or more storage tiers for at least a portion of the one or more data copies based on the scanning of the one or more usage tags, and cause at least a portion of the one or more data copies to be stored in the selected one or more storage tiers.

20 Claims, 4 Drawing Sheets

AUTOMATED USAGE BASED COPY DATA TIERING SYSTEM

FIELD

The field relates generally to data storage systems, and more particularly to copy data management in data storage systems.

BACKGROUND

Almost all current storage systems (e.g., storage arrays) offer the capability of generating and storing snapshots/clones (so called "copy data" or "data copies"). These sets of copy data can be used in a variety of ways for many different use cases, e.g., backup acceleration, test and development, analytics, forensics, disaster recovery, etc. Each use case has different kinds of service level requirements in terms of input-output operations per second (IOPS) and other service level agreement (SLA) terms, e.g., reliability, availability, responsiveness, etc. However, current storage systems treat each snapshot/clone in a similar manner, which results in higher storage cost and inefficiency in managing storage related to these copies.

SUMMARY

Illustrative embodiments provide for improved copy data management functionality in storage systems.

For example, in one illustrative embodiment, a method receives copy usage data for one or more data copies associated with a storage array, wherein the copy usage data is indicative of a usage associated with each of the one or more data copies, and updates the one or more data copies with one or more usage tags based on the received copy usage data.

Further, the method may then scan the one or more usage tags associated with each of the one or more data copies, select one or more storage tiers for at least a portion of the one or more data copies based on the scanning of the one or more usage tags, and cause at least a portion of the one or more data copies to be stored in the selected one or more storage tiers.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide copy data management functionality implemented in a storage system that enables the storage system to be aware of usage of copies and enhances automatic tiering capabilities of the storage system to associate these copies with different levels of SLAs based on usage.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
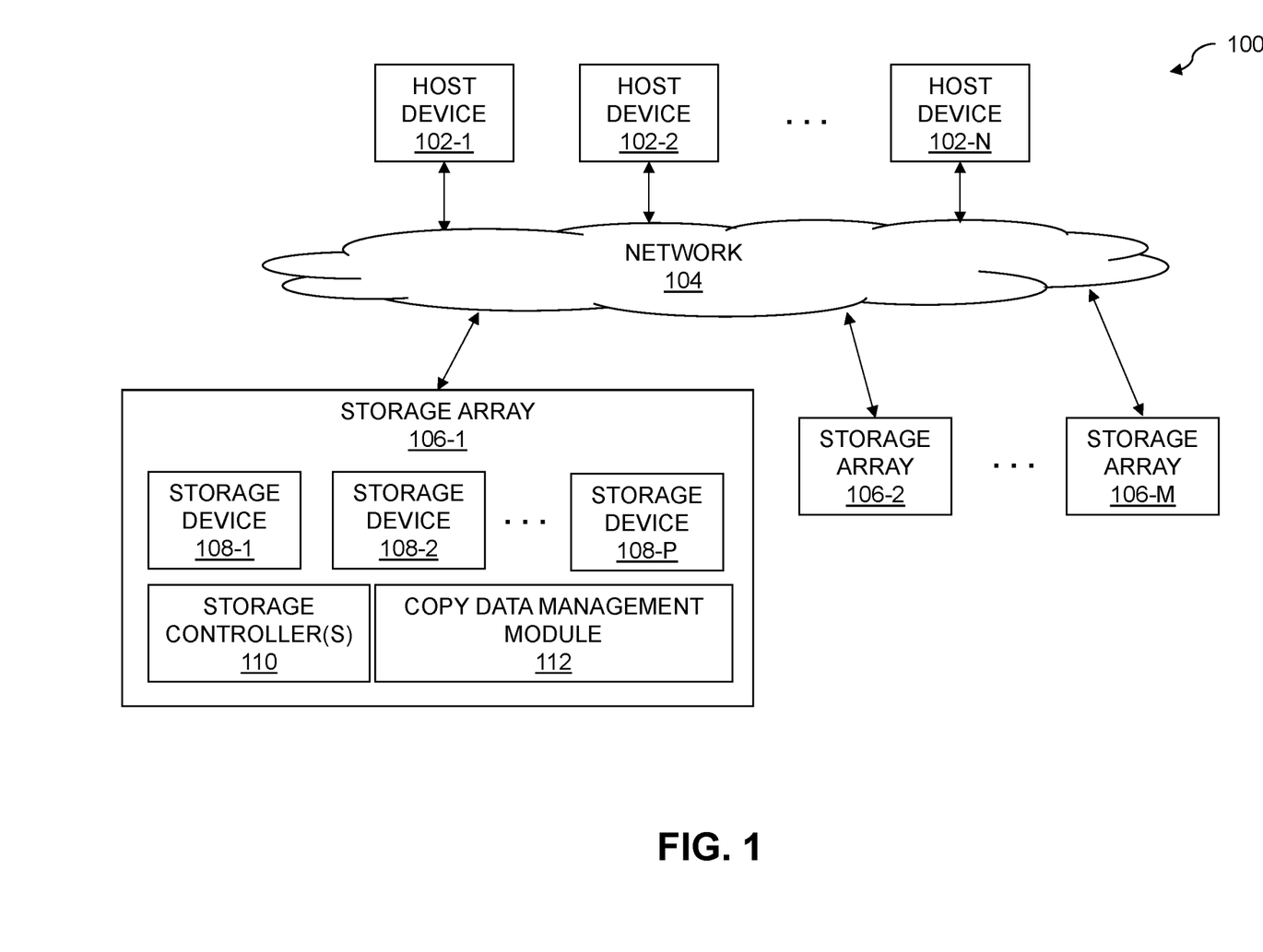
FIG. 1 illustrates an information processing system with automated usage based copy data tiering management according to an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands, e.g., a read operation comprises one or more read commands and a write operation comprises one or more write commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIG. 2.

The storage array 106-1 implements a copy data management (CDM) module 112, which is an example of what is referred to herein as a "control module" of a storage system. Although not explicitly shown in FIG. 1 for clarity of illustration, it is assumed in some embodiments that other ones of the storage arrays 106-2 through 106-M implement respective additional instances of a CDM module, as well as respective sets of storage devices and storage controllers in a manner similar to that described herein with respect to storage array 106-1. Further, although shown in FIG. 1 as being external to the storage controllers 110 of storage array 106-1, in other embodiments the CDM module 112 may be implemented at least partially within one or more of the storage controllers 110. For example, at least one of the storage controllers 110 may be implemented as a virtual storage controller running on an embedded hypervisor of the storage array 106-1. At least part of the CDM module 112 may be part of such a virtual storage controller, or may be run separate from the virtual storage controller on such an embedded hypervisor. Various other arrangements are possible, including where at least a portion of the functionality of the CDM module 112 is implemented external to the storage array 106-1 (e.g., on a separate server, on a cloud computing infrastructure, etc.). Details of the functionalities provided by and for CDM module 112 will be described below in the context of FIGS. 2 and 3.

Figure 2:
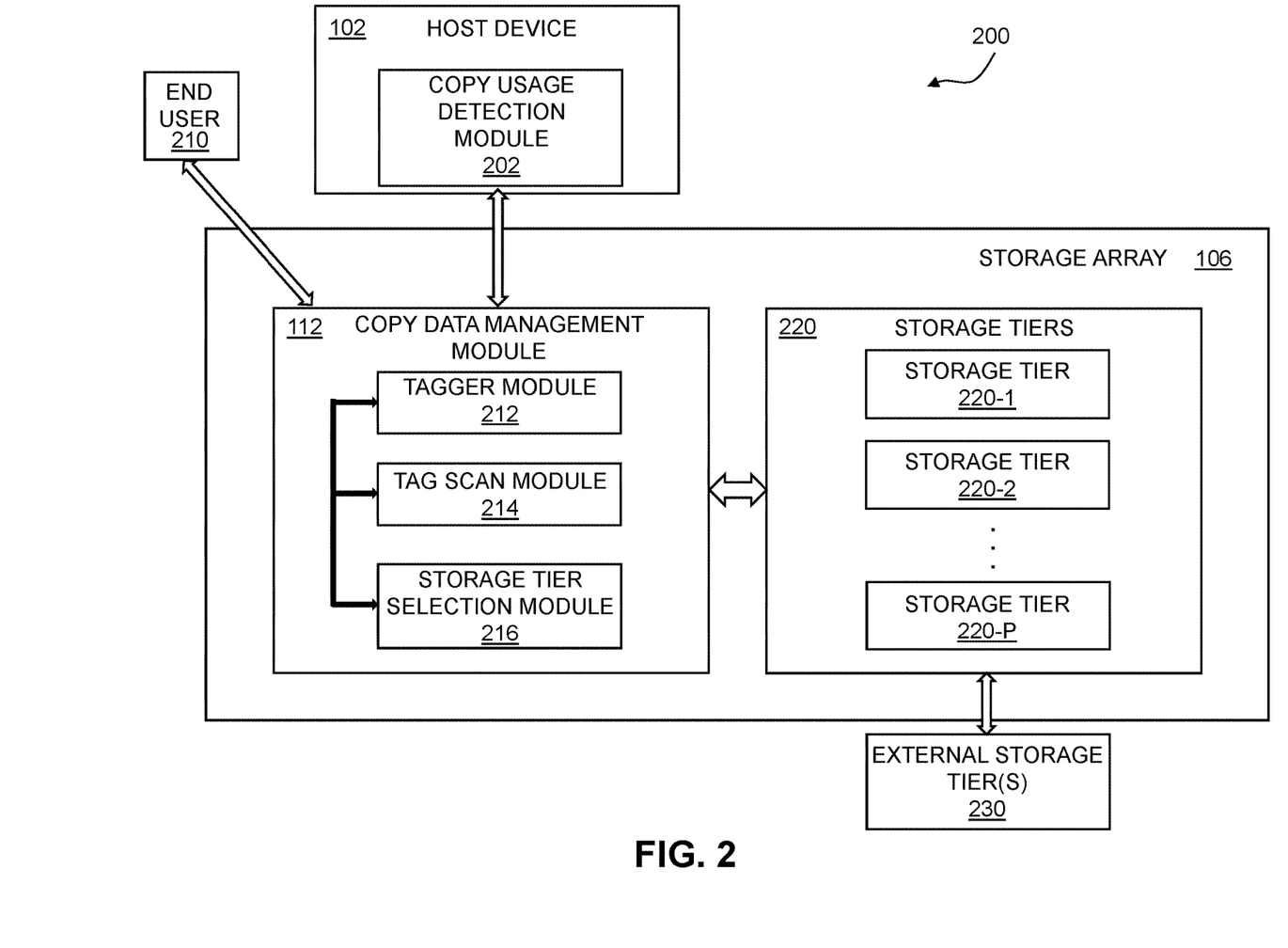
FIG. 2 illustrates further architecture details of an information processing system with automated usage based copy data tiering management according to an illustrative embodiment.

FIG. 2 illustrates further details of the information processing system 100 in the context of architecture 200. As shown, host device 102 (one or more of host devices 102-1, 102-2, . . . 102-N) is configured with a copy usage detection module 202. Copy usage detection module 202 and an end user 210 are shown operatively coupled to CDM module 112 in storage array 106 (one or more of storage arrays 106-1, 106-2, . . . 106-M). Further, CDM module 112 is configured with a tagger module 212, a tag scan module 214 and a storage tier selection module 216, as will be further explained below. CDM module 112 is also shown operatively coupled to a set of storage tiers 220 (e.g., storage tier 220-1, storage tier 220-2, . . . , storage tier P), as well as one or more external storage tiers 230. As used herein, "external" means remote from storage array 106 which can include, but is not limited to, a cloud storage platform, an object storage platform, and/or one or more of the other storage arrays 106. In illustrative embodiments, each of storage tiers 220 can be comprised on one or more of storage devices 108.

In illustrative embodiments, the CDM module 112 is configured as the single point of entry into the storage array 106 to obtain point-in-time copies of LUNs in the context of a production application (e.g., SQL, Oracle, Exchange, etc.). For example, end users of the copies use the CDM module 112 to obtain copies of the application data which is stored on a given storage array 106. End user 210 may, for example, be one of the host devices 102, some other application data user, and/or an information processing system administrator.

In illustrative embodiments, while creating the copies of the application, either the end user 210 specifies what the actual usage of copies is (e.g., if the copy is created as a backup copy or whether it is going to be used for test and development (TEST/DEV) or some other use case which requires copy modification, etc.) or agent software running on the application host such as copy usage detection module 202 (e.g., an adapted version of a multipath input/output (MPIO) product such as PowerPath® from Dell EMC of Hopkinton MA, or another form of lightweight agent pushed by the storage array 106 to host device 102) detects the actual usage of copies by identifying the IO patterns, e.g., transaction/sequential read/write, etc.

Based on the usage data received from copy detection module 202 and/or end user 210, the tagger module 212 of CDM module 112 updates the storage array copies with the appropriate tags, e.g., backup only copy, test/dev copy with high TOPS (e.g., for active database copies used for analytics or other use cases), backup acceleration copy with high read requirements, etc. Systems such as PMAX® from Dell EMC have built-in tagging functionality which can be used to tag the object. If the storage system does not have tagging functionality, as it could be difficult to modify metadata of copies in the storage array 106, tags could be stored in the tagger module 212 of CDM module 112.

A separate monitoring thread implemented in the tag scan module 214 of CDM module 112 (or elsewhere in the storage array 106) continuously scans the tags associated with the copies and, depending on the tags associated with a particular copy, the storage tier selection module 216 of CDM module 112 takes appropriate action (or causes appropriate action to be taken) by moving the blocks associated with the copies to the appropriate storage tier of storage tiers 220 and/or external storage tier(s) 230. For example, at least one of the storage tiers 220 and/or external storage tier(s) 230 can be a flash memory tier for very active IO associated copies while at least another one of the storage tiers 220 and/or external storage tier(s) 230 can be an archive storage tier to archive the copy to secondary storage systems or the inexpensive object/cloud storage systems for backup only copies.

Figure 3:
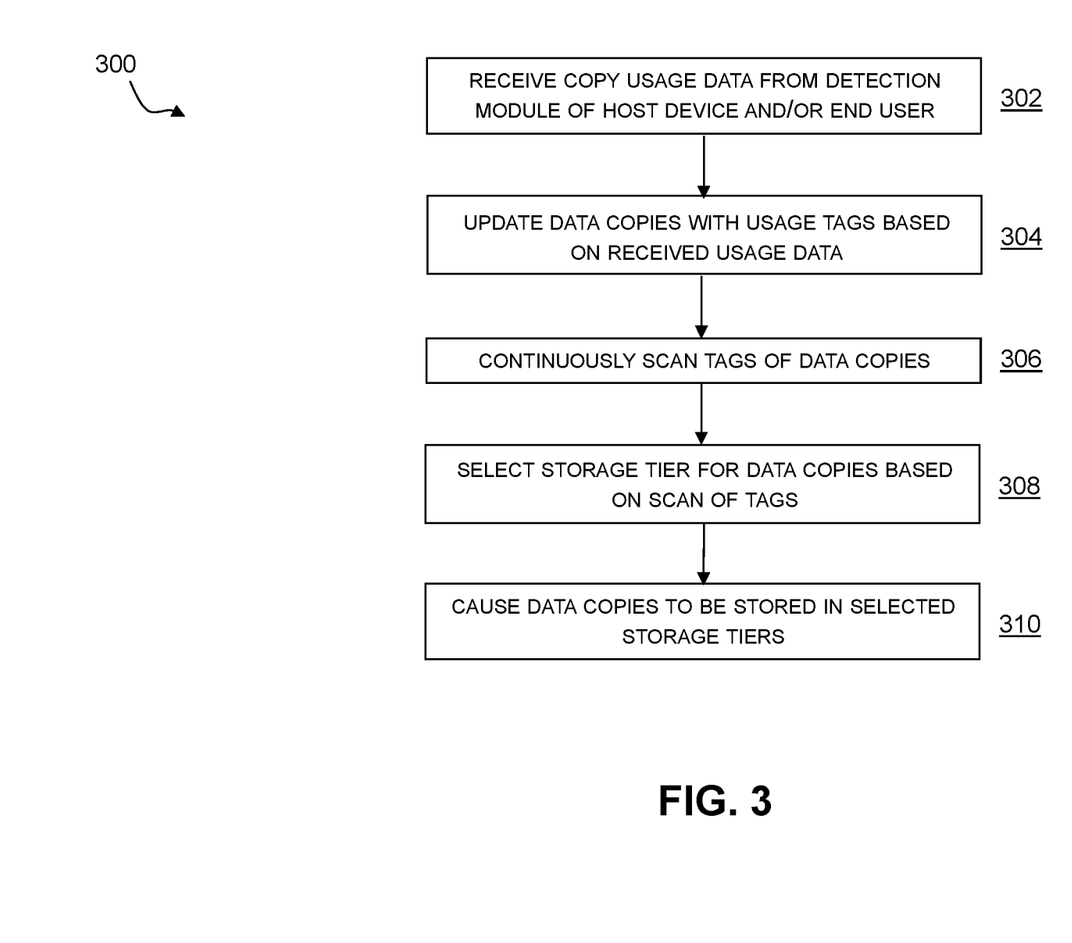
FIG. 3 illustrates a methodology for automated usage based copy data tiering management according to an illustrative embodiment.

FIG. 3 illustrates a copy data management methodology 300 according to an illustrative embodiment. It is to be appreciated that methodology 300 is one non-limiting example of steps that are executed by CDM module 112 in the context of architecture 200. More particularly, step 302 receives copy usage data from detection module (e.g., copy usage detection 202) of host device and/or end user (e.g., end user 210). Step 304 updates data copies with usage tags (e.g., tagger module 212) based on received usage data. Step 306 continuously scans tags (e.g., tag scan module 214) of data copies. Step 308 selects storage tier(s) (e.g., storage tier selection module 216) for data copies based on scan of tags. Step 310 causes data copies to be stored in selected storage tiers (e.g., storage tiers 220 and/or external storage tier(s) 230).

Many advantages are realized from the CDM module 112. For example, the cost associated with the storage array based copies is reduced by offloading data to lower tier storage for use cases which require very minimal use of copy data. Still further, enhanced service level objectives (SLO) are achieved for copies which requires capabilities such as transaction workload and active use of copies, e.g., analytics and TEST/DEV.

Furthermore, in some embodiments, when a data copy (e.g., snapshot or clone) is made, a new volume header (metadata) is created with a block table that points to the same physical blocks as the original volume. Thus, just after data copy creation, usage is limited to metadata. However, as more data copies are created and the production volume keeps on getting modified, the data copies usage changes (e.g., to maintain snapdiff functionality, etc.) and thus the CDM module 112 can cause application of tiering for the blocks specific to the data copies.

Still further, blocks specific to a particular data copy (snapshot) and no longer used by production (in terms of differential changed blocks) should be moved to a new tiered storage system based on their usage. In existing storage systems, such data copies may be getting tiered in a production volume tier which is a waste of production volume storage. It is realized here that blocks which are saved for a snapshot which is only marked for protection (not production) can be easily moved to a lower cost storage tier, e.g., cloud or other secondary storage tier. The CDM module 112 identifies this action and causes the data to be moved as needed or desired.

Figure 4:
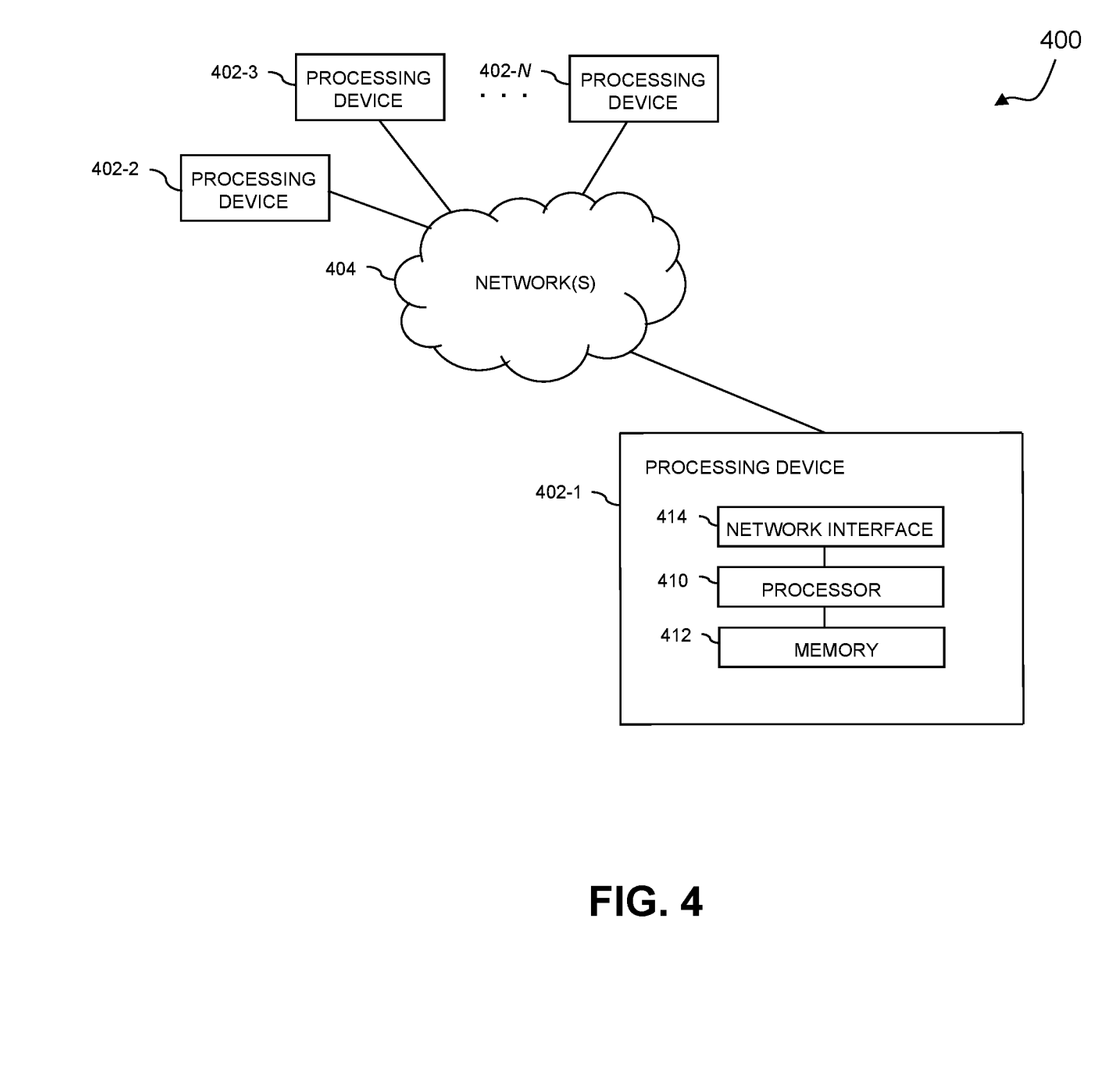
FIG. 4 illustrates a processing platform used to implement an information processing system with automated usage based copy data tiering management according to an illustrative embodiment.

FIG. 4 depicts a processing platform 400 used to implement improved copy data management functionality according to an illustrative embodiment. More particularly, processing platform 400 is a processing platform on which a computing environment with functionalities described herein (e.g., FIG. 1 and otherwise described herein) can be implemented.

The processing platform 400 in this embodiment comprises a plurality of processing devices, denoted 402-1, 402-2, 402-3, . . . 402-N, which communicate with one another over network(s) 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 402 shown in FIG. 4. The network(s) 404 represent one or more communications networks that enable components to communicate and to transfer data therebetween, as well as to perform other functionalities described herein.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random-access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1 and 2. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the networks 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1 and 4 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, implements a control module associated with a storage array configured to:
identify one or more service level objectives for one or more workloads accessing one or more data copies associated with the storage array, the one or more service level objectives characterizing expected copy usage data of the one or more data copies by the one or more workloads;
determine actual copy usage data for the one or more data copies associated with the storage array based at least in part on identifying input-output patterns of the data of the one or more data copies, the identified input-output patterns characterizing at least one of relative amounts of sequential and non-sequential input-output operations for the data of the one or more data copies and relative amounts of read and write input-output operations for the data of the one or more data copies, wherein the actual copy usage data is indicative of actual usage associated with each of the one or more data copies, and wherein at least a given one of the one or more data copies comprises a snapshot of a storage volume in a first storage tier of the storage array, the snapshot being marked for protection of the storage volume in the first storage tier of the storage array, and at least a subset of blocks of the given one of the one or more data copies being further marked for production in the first storage tier of the storage array;
update the one or more data copies with one or more usage tags based on the expected copy usage data and the determined actual copy usage data, wherein updating the given one of the one or more data copies with one or more usage tags based on the expected copy usage data and the determined actual usage data comprises associating at least a given one of the one or more usage tags with a volume header of the snapshot of the storage volume stored in the first storage tier; and responsive to detecting that at least a given block of the given one of the one or more data copies is no longer marked for production in the first storage tier of the storage array and remains marked for protection of the storage volume in the first storage tier of the storage array, migrate the given block of the given one of the one or more data copies from the first storage tier to a second storage tier specified by the given usage tag.

2. The apparatus of claim 1, wherein the control module is further configured to scan the one or more usage tags associated with each of the one or more data copies.

3. The apparatus of claim 2, wherein the control module is further configured to select one or more storage tiers for at least a portion of the one or more data copies based on the scan of the one or more usage tags.

4. The apparatus of claim 3, wherein the control module is further configured to cause at least a portion of the one or more data copies to be stored in the selected one or more storage tiers.

5. The apparatus of claim 3, wherein at least a portion of the one or more storage tiers are part of the storage array.

6. The apparatus of claim 3, wherein at least a portion of the one or more storage tiers are external to the storage array.

7. The apparatus of claim 1, wherein determining the actual copy usage data is based at least in part on information received from a host device operatively coupled to the storage array.

8. The apparatus of claim 1, wherein determining the actual copy usage data is based at least in part on information received from an end user of the storage array.

9. A method comprising:
identifying one or more service level objectives for one or more workloads accessing one or more data copies associated with the storage array, the one or more service level objectives characterizing expected copy usage data of the one or more data copies by the one or more workloads;

determining actual copy usage data for the one or more data copies associated with a storage array based at least in part on identifying input-output patterns of the data of the one or more data copies, the identified input-output patterns characterizing at least one of relative amounts of sequential and non-sequential input-output operations for the data of the one or more data copies and relative amounts of read and write input-output operations for the data of the one or more data copies, wherein the actual copy usage data is indicative of actual usage associated with each of the one or more data copies, and wherein at least a given one of the one or more data copies comprises a snapshot of a storage volume in a first storage tier of the storage array, the snapshot being marked for protection of the storage volume in the first storage tier of the storage array, and at least a subset of blocks of the given one of the one or more data copies being further marked for production in the first storage tier of the storage array;

updating the one or more data copies with one or more usage tags based on the expected copy usage data and the determined actual copy usage data, wherein updating the given one of the one or more data copies with one or more usage tags based on the expected copy usage data and the determined actual usage data comprises associating at least a given one of the one or more usage tags with a volume header of the snapshot of the storage volume stored in the first storage tier; and responsive to detecting that at least a given block of the given one of the one or more data copies is no longer marked for production in the first storage tier of the storage array and remains marked for protection of the storage volume in the first storage tier of the storage array, migrating the given block of the given one of the one or more data copies from the first storage tier to a second storage tier specified by the given usage tag;

wherein the steps are performed by at least one processing device comprising a processor coupled to a memory executing program code.

10. The method of claim 9, further comprising scanning the one or more usage tags associated with each of the one or more data copies.

11. The method of claim 10, further comprising selecting one or more storage tiers for at least a portion of the one or more data copies based on the scanning of the one or more usage tags.

12. The method of claim 11, further comprising causing at least a portion of the one or more data copies to be stored in the selected one or more storage tiers.

13. The method of claim 11, wherein at least a portion of the one or more storage tiers are part of the storage array.

14. The method of claim 11, wherein at least a portion of the one or more storage tiers are external to the storage array.

15. The method of claim 9, wherein determining the actual copy usage data is based at least in part on information received from a host device operatively coupled to the storage array.

16. The method of claim 9, wherein determining the actual copy usage data is based at least in part on information received from an end user of the storage array.

17. A computer program product comprising a non-transitory processor-readable storage medium having stored therein program code of one or more software programs, wherein the program code when executed by the at least one processing device causes the at least one processing device to:

identify one or more service level objectives for one or more workloads accessing one or more data copies associated with the storage array, the one or more service level objectives characterizing expected copy usage data of the one or more data copies by the one or more workloads;

determine actual copy usage data for the one or more data copies associated with a storage array based at least in part on identifying input-output patterns of the data of the one or more data copies, the identified input-output patterns characterizing at least one of relative amounts of sequential and non-sequential input-output operations for the data of the one or more data copies and relative amounts of read and write input-output operations for the data of the one or more data copies, wherein the actual copy usage data is indicative of actual usage associated with each of the one or more data copies, and wherein at least a given one of the one or more data copies comprises a snapshot of a storage volume in a first storage tier of the storage array, the snapshot being marked for protection of the storage volume in the first storage tier of the storage array, and at least a subset of blocks of the given one of the one or more data copies being further marked for production in the first storage tier of the storage array;

update the one or more data copies with one or more usage tags based on the expected copy usage data and the determined actual copy usage data, wherein updating the given one of the one or more data copies with one or more usage tags based on the expected copy usage data and the determined actual usage data comprises associating at least a given one of the one or more usage tags with a volume header of the snapshot of the storage volume stored in the first storage tier; and responsive to detecting that at least a given block of the given one of the one or more data copies is no longer marked for production in the first storage tier of the storage array and remains marked for protection of the storage volume in the first storage tier of the storage array, migrate the given block of the given one of the one or more data copies from the first storage tier to a second storage tier specified by the given usage tag.

18. The computer program product of claim 17, wherein the program code when executed by the at least one processing device further causes the at least one processing device to scan the one or more usage tags associated with each of the one or more data copies.

19. The computer program product of claim 18, wherein the program code when executed by the at least one processing device further causes the at least one processing device to select one or more storage tiers for at least a portion of the one or more data copies based on the scan of the one or more usage tags.

20. The computer program product of claim 19, wherein the program code when executed by the at least one processing device further causes the at least one processing device to cause at least a portion of the one or more data copies to be stored in the selected one or more storage tiers.

\* \* \* \* \*